United States Patent Office 3,476,142
Patented Nov. 4, 1969

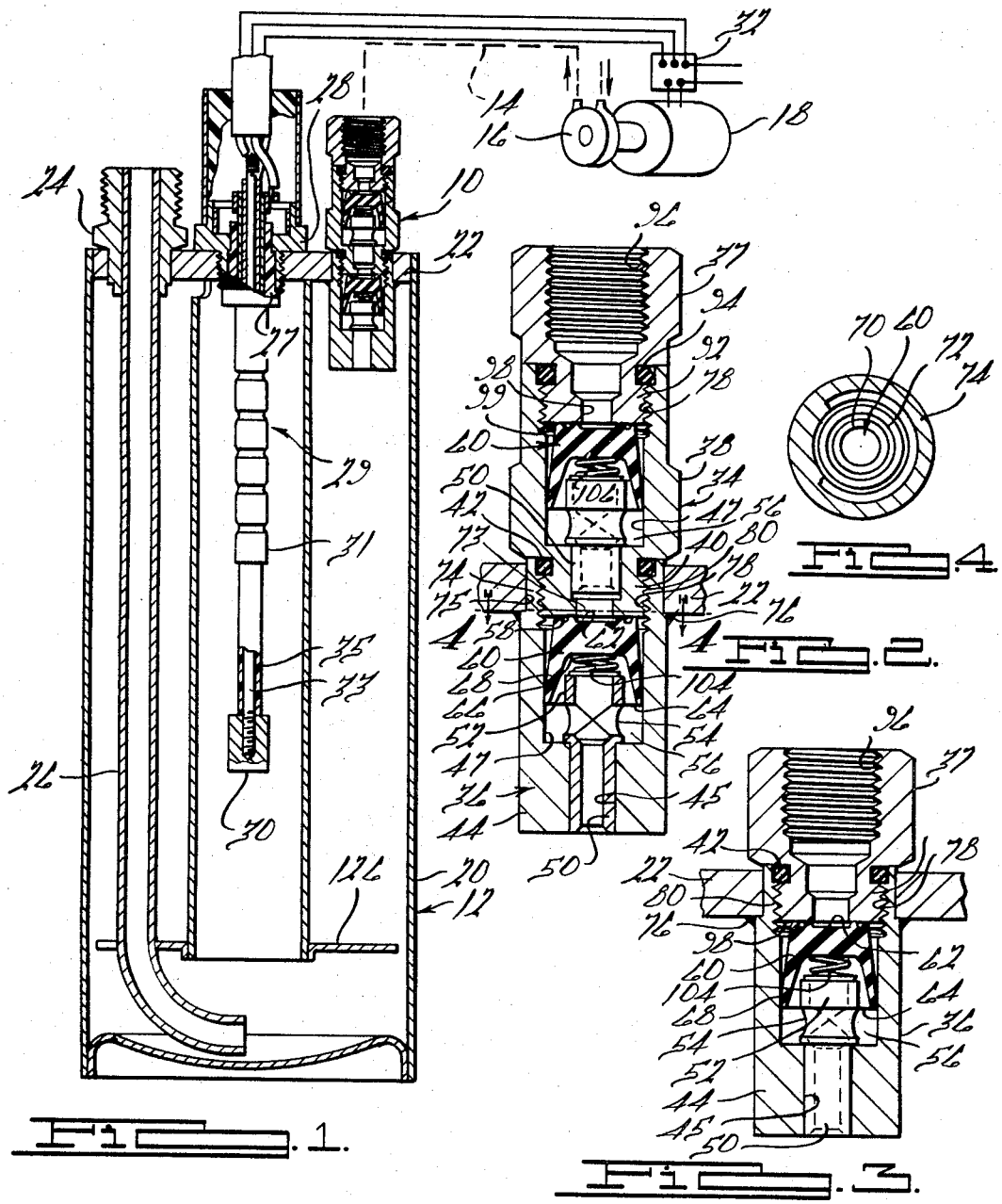

3,476,142
MULTIPLE CHECK VALVE
Wilfred R. Schultz, Troy, Mich., assignor, by mesne assignments, to Eaton Yale & Towne Inc., Cleveland, Ohio, a corporation of Ohio
Filed Sept. 16, 1966, Ser. No. 579,891
Int. Cl. F16k 15/14, 17/00, 21/04
U.S. Cl. 137—512     1 Claim

ABSTRACT OF THE DISCLOSURE

A double check valve unit for a carbonator apparatus which is supplied with water and $CO_2$ gas, said double check valve unit comprising: a first valve body, a first check valve positioned in said first valve body, a second valve body and a second check valve positioned in said second valve body, and structure for removably mounting the first valve body and second valve body in upper and lower relationship relative to each other, that is, one mounted above the other, whereby in applications requiring only a single check valve unit the upper valve body and its accompanying check valve may be removed from the unit.

---

This invention relates generally to carbonating apparatus suitable for charging beverages and water with carbon dioxide gas and more particularly, to a double check valve arrangement in such apparatus for preventing any backup of the carbonated fluid into the water supply system. It represents an improvement over the check valve unit disclosed in Patent No. 3,010,477, issued Nov. 28, 1961, and assigned to the assignee of the present invention.

In carbonating apparatus, it has become a requirement of certain State and local laws that a dooble check valve be provided at the entrance to the carbonator to prevent any backflow of the carbonated water that might result in corrosion of the water supply pipes and a danger to health. Other local laws, however, permit the use of a single check valve arrangement for accomplishing this same purpose. Accordingly, the present invention provides a double check valve arrangement which may be suitably used also as a single check valve with certain rearrangement of parts.

In the invention, a first valve body is adapted to be attached to the tank of the carbonator, with this valve body preferably being positioned within the tank to reduce the protrusion of the valve from the tank. This check valve body has a check valve positioned therein which communicates with the interior of the carbonator through an opening in the valve body. A second valve body of substantially similar arrangement is threaded into an opening into the first valve body. This second valve body has a check valve positioned therein similar to the first valve body and has a threaded opening at its end opposite the first valve body to receive a threaded socket that is adapted to be coupled to the water supply line. The coupling means in the opening in the first valve body for the reception of the second valve and the coupling means in the opening in the second valve body for reception of the coupling are substantially identical. Similarly, the coupling means on the second valve body that is received in the opening in the first valve body and the coupling means on the coupling that is received in the second valve body substantially are identical. This arrangement permits the use of either a double check valve arrangement or a single check valve arrangement with a very minimum of inconvenience in converting from the double check valve arrangement to the single check valve arrangement or vice versa.

The invention also provides for the second valve body to furnish the valve seat for the check valve found in the first valve body and for the coupling member to furnish the valve seat for the check valve found in the second valve body. This reduces the number of parts employed in the combination to a very minimum.

As pointed out above, the invention also contemplates positioning the first valve body within the carbonator tank to thereby reduce the protrusion of the check valve from the tank, and to reduce the height of the overall carbonator vessel when the check valve is positioned in the top wall thereof.

It is an object of the invention to provide an interchangeable double or single check valve arrangement for a carbonator that employs a very minimum number of parts and in which the conversion from the double to the single check valve arrangement or vice versa is accomplished with facility and a minimum amount of inconvenience.

It is a further object of the invention to provide a double check valve arrangement for a carbonator in which the valve seats for the check valves are positioned on the next succeeding members in the double check valve arrangement when considered in relation to any reverse flow that may occur through the valves.

A further object of the invention is the provision of a check valve arrangement for a carbonator in which the overall height of the vessel is substantially reduced by positioning one of the check valve bodies within the interior of the vessel which contains the carbonated liquid.

Other objects and attendant advantages of the present invention may be more readily realized as the specification is considered in connection with the attached drawings in which:

FIGURE 1 is a composite view showing a carbonator in vertical section and showing the water supply means for the carbonator in diagrammatic form, as well as illustrating the check valves of the invention in assembly with the carbonator;

FIGURE 2 is a longitudinal sectional view through the double check valve arrangement of the present invention;

FIGURE 3 is a longitudinal sectional view showing the check valve arrangement of the present invention used as a single check valve; and FIGURE 4 is a transverse sectional view taken along the lines 4—4 of FIGURE 2.

With reference to the drawing, the check valve unit of this invention, indicated generally at 10, is illustrated in FIG. 1 in assembly relation with a carbonator 12 adapted to be connected to a water supply line 14 which communicates with a pump 16 driven by an electric motor 18. The carbonator 12, which is described in detail in U.S. Patent No. 2,798,135, owned by the assignee of this invention, includes a hermetically tight tank or shell 20 having a top wall or closure plate 22 which supports a fitting 24 for a carbonated water discharge tube 26. The top wall 22 also carries a support fitting 28 for an insulating tube 27, and liquid level control apparatus, indicated generally by the numeral 29, is mounted in and extends downwardly from the tube 27. The apparatus 29 consists of a tubular electrode 31 and a rod-shaped electrode 33 of greater length than electrode 31. Electrode 33 is fitted with a tubular insulating sheath 35 of flexible plastic material, the sheath being of a diameter to fit the inner wall of the tubular electrode 31 and support the rod electrode in coaxial relation to the tubular electrode. The lower end of rod electrode 33 extends below the lower end of the sheath 35 and is threaded to receive an enlarged tip 30 of carbon or graphite. The electrodes 31 and 33 are connected to a relay 32 which is in turn connected to the pump motor 18 for starting and stopping the motor 18 to maintain a liquid level in the carbonator 12 which is between the lower ends of the electrodes 31 and 33.

The top wall 22 also supports a $CO_2$ gas inlet fitting (not shown) adapted to be connected to a source of $CO_2$ gas through suitable pressure control devices in a manner well known in the carbonator art. This fitting may conveniently be identical to the check valve unit 10 which is effective to positively prevent backflow of $CO_2$ gas.

The check valve unit 10 includes a tubular body 34 formed in three parts, a lower part or first valve body 36, an upper part or coupling member 37 and an intermediate part or second valve body 38 which has a lower end portion 40 that is threaded into the upper end portion of the lower part or first valve body 36 so as to compress an O-ring 42 therebetween and maintain the parts 36 and 38 in a fluid-tight relationship. The lower part or first valve body 36 is provided with a first end bore 45 which extends through the outlet portion 44 and a second larger bore 47 which extends through the main portion of the lower part or first valve body 36 and communicates with the bore 45.

A tubular nozzle member 50 is press-fitted in the bore 45 and has an enlarged upwardly projecting extension 52 which is positioned within the bore 47 and is provided with transversely extending inlet openings 54.

A valve member 60, of inverted cup shape, is positioned within the lower part of first valve body 36 in a chamber 56 formed by the bore 47 and extending between the bore 45 and the lower end surface 58 of the intermediate part or second valve body 38 which, as will appear hereinafter, functions as a valve seat. The valve member 60 has a substantially disk-shape base 66 and a depending annular wall 68 which tapers downwardly and is of a diameter at its lower end 64 corresponding substantially to the diameter of the chamber 56. The taper of the wall 68 is such that at its lower end 64, it has substantially no thickness. The base 66 is of a diameter slightly less than the diameter of the chamber 56 and has its outer edge tapered so that it conforms to the taper of the wall 68.

One side 62 of the base 66 is arranged in an opposing relation to the valve seat 58 and is formed with a pair of sealing rings 70 and 72, of a substantially half O-shape in cross section. The rings 70 and 72 are concentric with the axis of the valve member 60 and of a diameter to extend around a passage 73 in the valve seat 58 when the rings 70 and 72 are positioned in sealing engagement with the valve seat 58. The valve member 60 is molded from a resilient material such as Buna-N, natural rubber, neoprene or polyethylene.

As can be readily appreciated by inspection of the drawings, the lower part or first valve body 36 of the check valve unit 10 is positioned within the tank or shell 20 by means of a reduced section 74 that is positioned within a bore or aperture 75 in the top wall or closure plate 22 of the tank 20. It may be affixed in this position by any suitable means, for example, by welding, as shown at 76.

The second larger bore 47 in the lower part or first valve body 36 is internally threaded at 78 to threadingly receive a threaded portion 80 of the lower end portion 40 on the second valve body or intermediate part 38. The threading of the threaded portion 80 into the threads 78 compresses the O-ring seal 42 and provides a fluid-tight relationship between the lower part or first valve body 36 and the intermediate part or second valve body 38.

The second valve body or intermediate portion 38 of the check valve unit is formed substantially the same as the first valve body or lower part 36. A valve member 60 and a tubular nozzle member 50 identical to those employed in the first valve body or lower member 36 are positioned with an identical bore 47.

The bore 47 in the intermediate member or second valve body 38 is threaded identically to the bore 47 in the lower part or first valve body 36, as identified by the numeral 78 and it receives a threaded portion 92 on the lower end of the uper part 37 or coupling member of the check valve assembly. The threading of these two members compresses an O-ring seal 94 to provide a fluid-tight relationship between the uppermost or coupling member 37 and the intermediate part or second valve body 38. The upper part or threaded coupling 37 has an internally threaded bore 96 that reduces to an unthreaded reduced bore portion or inlet passage 98 that opens through a valve seat 99 into the bore 47 in the intermediate part or second valve body 38. A pair of springs 104 and 106 are positioned between the tubular nozzle members 50, in both the valve bodies 36 and 38, and the valve members 60 to urge the valve members upwardly. The sealing rings 70 and 72 of the valve member 60 positioned in the bore 47 of the intermediate part or second valve body are, therefore, seated on the valve seat 99 of the coupling or upper part 37 and the sealing rings 70 and 72 of the valve member 60 positioned in the bore 47 in the first valve body 36 are seated against the valve seat 58 positioned on the second valve body or intermediate member 38.

As pointed out above, the double check valve arrangement of the present invention is shown in section in FIGURE 2 and the invention thus far has been described in relation to this double check valve unit or arrangement. In FIGURE 3, there is shown the single check valve arrangement of the present invention in which the intermediate part or second valve body 38 is eliminated. This is done by merely detaching or unthreading the second valve body or intermediate part 38 from the first valve body or lower part 36 of the check valve unit and then uncoupling or dethreading the upper part or coupling member 37 from the second valve body or intermediate part 38. Thereafter, the uppermost part or coupling member 37 is threaded into the threads 78 positioned in the bore 47 of the lower part or first valve body 36. This provides the single check valve unit shown in FIGURE 3.

The valve unit 10 is assembled with the carbonator so that the water delivered to the valve unit 10 is introduced under pressure into the carbonator 12 in the form of a solid stream or jet directed toward a baffle plate 126 in the carbonator tank 20. In the use of the carbonator, the $CO_2$ gas inlet fitting is connected with a source of gas under pressure and the pump 16 is connected to a water supply line adapted to supply water under pressure to the unit 10. When the liquid level in the tank 20 falls below the electrode tip 30 the pump 16 operates to deliver water at the pump discharge pressure to the unit 10 so that the water in the inlet passage 98 is at a pressure exceeding the pressure in the tank 20. As a result, the valve members 60 are moved in a direction toward each nozzle extension 52 to thereby move the sealing rings 70 and 72 off the valve seats 58 and 99. Movement of each valve member 60 in this direction is limited by engagement of the base 66 with the nozzle extension 52. The side wall 68 of each valve member 60 deflects inwardly to allow water to travel around each valve member into each chamber 56 and through the openings 54 in each nozzle extension 52 for discharge out of the unit 10 through the nozzle 50 located in the lower part or first valve body 36.

The water is discharged from nozzle 50 in the form of a solid jet which is projected into the body of liquid in the carbonator at high velocity and causes the liquid to vigorously boil and bubble in the presence of the compressed gas which is maintained under the predetermined supply pressure. When the liquid level rises to the level of the lower end of electrode tube 31, the pump 16 is shut off so that the pressure in the inlet passage 98 falls to a pressure below the pressure in the tank 20. The valve members 60 are moved by this pressure differential in an opposite direction to a position in which the rings 70 and 72 engage their respective valve seats 58 and 99 and the annular wall 68 of each valve member 60 is in engagement with the valve body in which it is positioned.

The action of each valve member 60 in providing a double check action is fully described in the above-mentioned Patent No. 3,010,477.

It can be appreciated that the conversion from the double check valve arrangement shown in FIGURE 2 to the single check valve arrangement shown in FIGURE 3 or vice versa may be accomplished with great facility and with a minimum of inconvenience since the coupling means in the form of the threaded connections between the lower part or first valve body 36 and the intermediate part or second valve body 38 and between the intermediate part or second valve body 38 and the upper part or coupling member 37 are identical, and since the valve seats 99 and 58 positioned on the coupling or upper part 37 and the second valve body or intermediate part 38, respectively, both provide substantially identical valve seats for the sealing rings 70 and 72 of the valve members 60.

Furthermore, the invention provides the advantage that the protrusion of the valve unit 10 from the tank 20 is reduced by positioning the first valve body or lower part 36 of the valve unit 10 within the interior of the tank 20.

It will be understood that the specific construction of the improved check valve unit which is herein disclosed and described is presented for purposes of explanation and illustration and is not intended to indicate limits of the invention, the scope of which is defined by the following claim.

What is claimed is:
1. A check valve unit for a carbonator apparatus to be supplied with water and $CO_2$ gas comprising:
   a first valve body adapted to be attached to the carbonator,
   a first spring biased check valve positioned in said first valve body,
      said first valve body having an opening at one end adapted to communicate with the interior of the carbonator,
   a second valve body,
   a second spring biased check valve positioned in said second valve body,
   a coupling member having means at one end adapted to be coupled to a line having fluid under pressure,
   first cooperating coupling means on the end of said first valve body opposite said opening and on one end of said second valve body for coupling said first valve body and said second valve body in a fluid-tight relationship,
   second cooperating coupling means on the end of said second valve body opposite said first mentioned coupling means and on the end of said coupling member, opposite said one end thereof, for coupling said second valve body to said coupling member in a fluid-tight relationship,
   whereby a double check valve unit is provided,
      said first and second cooperating coupling means being substantially identical whereby said second valve body may be eliminated and said coupling member may be coupled directly to said first valve body to provide a single check valve unit, and said unit including
   flow path means generally extending centrally through the length of the unit for permitting flow of said fluid through the unit,
   said unit being further characterized in that, said first cooperating coupling means comprises a threaded bore in said first valve body and a cooperating external threaded portion on said second valve body and said second cooperating coupling means comprises a threaded bore in said second valve body and a cooperating external threaded portion on said coupling member, and wherein
   the end of said second valve body coupled to said first valve body defines a valve seat for the check valve positioned in said first valve body and the end of said coupling member coupled to said second valve body defines a valve seat for the check valve positioned in said second valve body, and said first valve body being positioned inside a tank of the carbonator apparatus to thereby lower the extent of the protrusion of the double check valve on the exterior of the tank.

References Cited
UNITED STATES PATENTS

| | | | |
|---|---|---|---|
| 562,267 | 6/1896 | Albin | 137—614.2 X |
| 1,147,840 | 7/1915 | Bowser | 137—512 X |
| 1,388,602 | 8/1921 | Rotteleur | 137—512 X |
| 1,566,613 | 12/1925 | McDonald | 137—614.2 X |
| 2,181,768 | 11/1939 | Rowell | 261—27 X |
| 2,758,609 | 8/1956 | Dickert et al. | 137—512 X |
| 2,784,561 | 3/1957 | Postlewait | 137—525 X |
| 3,010,477 | 11/1961 | Graham | 137—516.25 |

FOREIGN PATENTS 565,731  3/1958  Belgium.

WILLIAM F. O'DEA, Primary Examiner

D. J. ZOBKIW, Assistant Examiner

U.S. Cl. X.R.

137—516.25, 525, 614.2